United States Patent [19]

Milberger et al.

[11] 3,852,620
[45] Dec. 3, 1974

[54] ELECTRICAL PULSE GENERATING CIRCUIT AND METHOD

[75] Inventors: Walter E. Milberger, Severna Park; Donald C. Lewns, Baltimore, both of Md.

[73] Assignee: Westinghouse Electric Corporation, Pittsburgh, Pa.

[22] Filed: July 31, 1972

[21] Appl. No.: 276,342

[52] U.S. Cl.................. 307/268, 307/275, 307/300
[51] Int. Cl.......................... H03k 5/12, H03k 5/01
[58] Field of Search..................... 307/268, 275, 300

[56] References Cited
UNITED STATES PATENTS
3,194,979  7/1965  Toy..................................... 307/254
3,219,844  11/1965  Martin............................... 307/254
3,253,160  5/1966  Hall et al. ....................... 307/300 X Primary Examiner—John Zazworsky
Attorney, Agent, or Firm—D. Schron

[57] ABSTRACT

A method and circuit for generating electrical pulses having a minimum of amplitude and edge jitter, particularly suited for supplying accurately timed high voltage pulses to linear beam devices utilized in radar transmitters. A first transistor is intermittently triggered into and maintained in trigger signal and returned to a non-conductive condition in response to the triggering of a second transistor into saturation by a second trigger signal. An output pulse is provided in response to the saturation and nonconducive conditions of the first transistor. A bipolar clipping circuit for pulse amplitude shaping and an arc protection circuit are also disclosed.

17 Claims, 4 Drawing Figures

ELECTRICAL PULSE GENERATING CIRCUIT AND METHOD

BACKGROUND OF THE INVENTION

1. Field of the Invention

This invention relates to a method and circuit for generating electrical pulses and, more particularly, to a method and circuit for generating low jitter, high voltage pulses for intermittently energizing an electromagnetic wave energy transmitter particularly of the type utilized in a pulsed radar system.

2. State of the Prior Art

Wave energy transmission systems of the type employing high power, linear devices such as klystrons and traveling wave tubes are ordinarily intermittently energized in radar and other similar applications to thereby generate pulses of wave energy for target tracking or the like. In many applications, and particularly in tracking radars, the rise and fall times and the duration and the amplitude of the pulses applied to the transmitter are critical. For example, variations in the amplitude of the pulses applied to the linear beam device result in variations in the power level of the transmitted signal, i.e., amplitude jitter, and leading or trailing edge jitter results if the duration of the pulses applied to the transmitter varies from pulse to pulse.

As accuracy requirements have increased, radar pulsing circuits have increased in both complexity and cost. For example, it may be necessary, in the event that circuit components are replaced, to match replacement components in an exacting manner. Moreover, the power requirements of typical radar pulsers may be extremely high particularly where linear amplification is employed in the pulser circuitry. High power requirements may, of course, dictate the use of either electron tube circuits for pulsing the radar transmitter or expensive high power semiconductors.

OBJECTS AND SUMMARY OF THE INVENTION

It is accordingly an object of the present invention to provide a novel method and circuit for pulsing a wave energy transmitter.

It is a further object of the present invention to provide a novel method and circuit for pulsing a wave energy transmitter wherein the circuit components may be readily changed with minimum of change in output pulse characteristics.

It is another object of the present invention to provide a novel method and circuit for generating low jitter, high voltage pulses for intermittently energizing a wave energy transmitter wherein the spacing between two narrow pulses accurately determines the duration of the generated pulse, the accuracy of the duration of the generated pulse being further insured by discharging any stored load energy at the desired end of the generated pulse.

It is yet another object of the present invention to provide a novel method and circuit for pulsing a wave energy transmitter wherein each pulse is generated in response to first and second relatively narrow trigger signals, the amplitude of each pulse being independent of the amplitude of the trigger signals and the duration of each pulse being substantially equal to the spacing between corresponding portions of the trigger signals.

It is yet a further object of the present invention to provide a novel method and circuit for generating low jitter, high voltage pulses for intermittently energizing a wave energy transmitter wherein semiconductor elements are operated only in saturation and in a cutoff or nonconduction condition to generate the pulses to thereby minimize component power ratings, and wherein the semiconductor elements are protected from damage in the event of loss of trigger signals.

These and many other objects and advantages are accomplished in accordance with the present invention by intermittently triggering a first semiconductor means into saturation in response to a first trigger signal, and then returning the first semiconductor means to a nonconductive condition in response to the triggering of a second semiconductor means into saturation by a second trigger signal. An output signal is provided responsively to the saturation and nonconductive conditions of the first semiconductor means and, because the first semiconductor means operates only in saturation or in cutoff, the amplitude of the output signal is independent of the amplitude of the trigger signals. Moreover, the second semiconductor means is operatively connected to the control electrode of the first semiconductor means to thereby rapidly and consistently discharge the charge stored by the interelectrode capacitance of the first semiconductor means so that the saturation of the second semiconductor means rapidly drives the first semiconductor means into a nonconductive condition. The duration of the output signal is thereby substantially equal to the spacing between corresponding portions of the trigger signals, the accuracy of this duration being further insured by discharging any stored load energy through the conductive second semiconductor means. In addition, should the said second semiconductor means fail to drive the first semiconductor means into a nonconductive condition, means are provided to render the first semiconductor means nonconductive prior to a time at which the load current becomes excessive.

DETAILED DESCRIPTION

Figure 1:
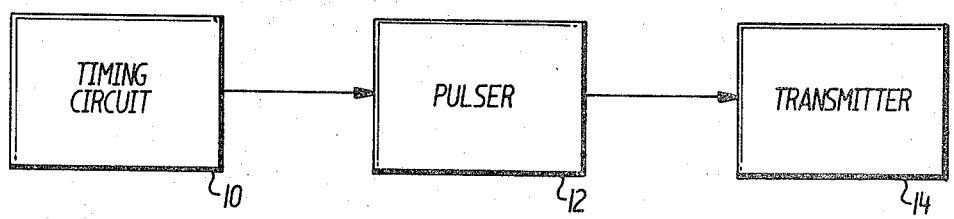
FIG. 1 is a functional block diagram of a general prior art wave energy transmission system.

A typical system wherein the pulser of the present invention may be particularly useful is illustrated in FIG. 1 and may include a timing circuit 10, a pulser 12 and a wave energy transmitter 14, such as a klystron. The timing circuit 10 supplies timing signals, e.g., one or more accurately spaced pulses at a predetermined repetition rate, and, in response to the timing signals, the pulser 12 generates a transmitter pulsing signal of sufficient amplitude to energize the transmitter 14. The individual pulses of the high voltage pulsing signal are then applied to the wave energy transmitter 14 to energize the transmitter for the duration thereof.

As was previously mentioned, the pulser 14 must ordinarily provide an extremely high voltage pulse having stable amplitude and duration characteristics. One embodiment of the present invention which provides these desirable pulse characteristics is illustrated in FIG. 2.

Figure 2:
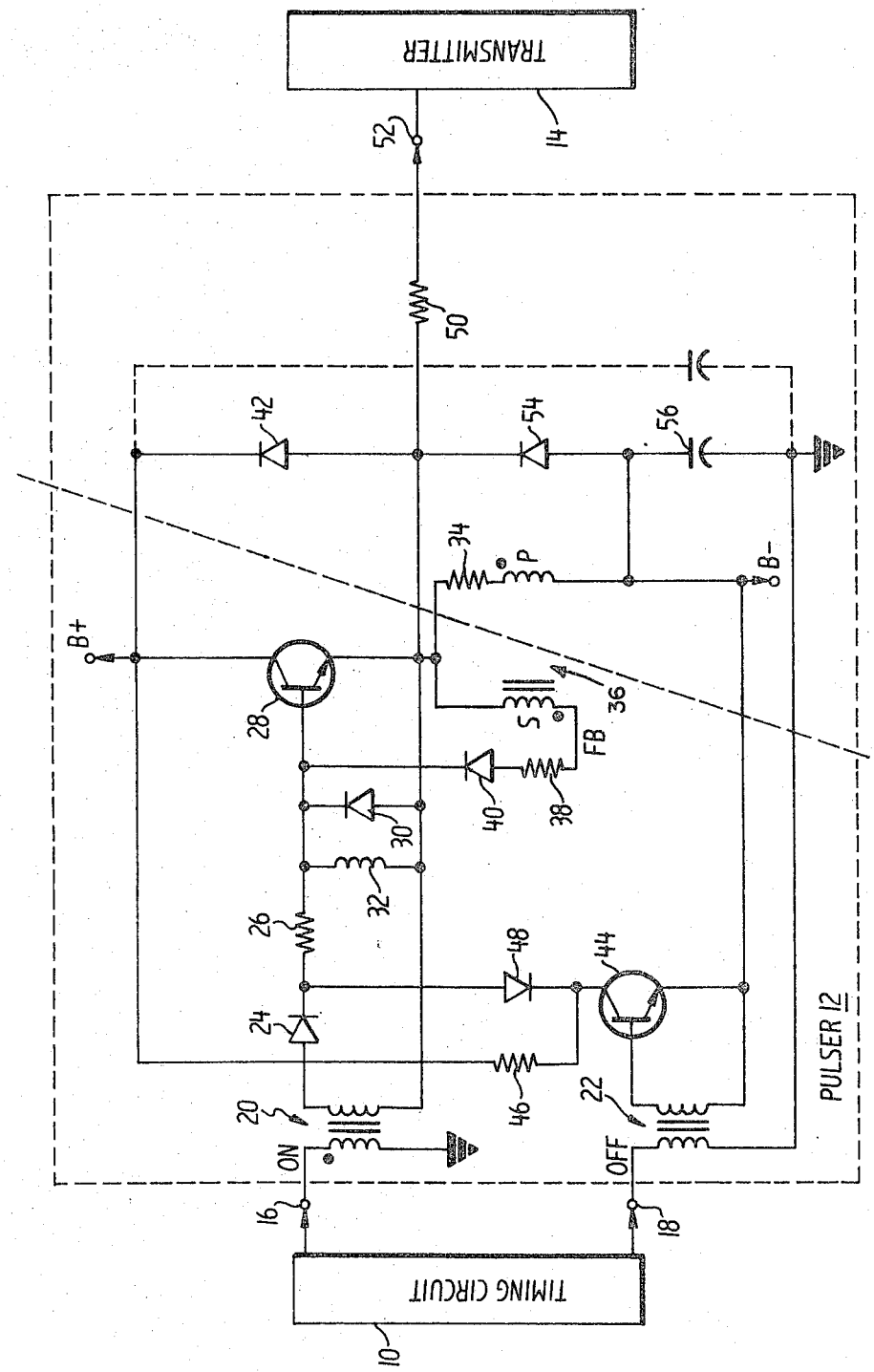
FIG. 2 is a schematic diagram of one embodiment of the circuit of the present invention utilized as the transmitter pulser in the system of FIG. 1.

Referring now to FIG. 2, ON and OFF timing signals from the timing circuit 10 of FIG. 1 may be applied respectively to the input terminals 16 and 18 of the pulser. The ON trigger signal from the terminal 16 may be applied to the primary winding of an isolation transformer 20. One end of the secondary winding of the transformer 20 may be connected through a blocking diode 24 and current limiting resistor 26 to the base electrode of a suitable NPN transistor 28 and the other end of the secondary winding of the transformer 20 may be connected directly to the emitter electrode of the transistor 28. A suitable bypass diode 30 may be connected between the base and emitter electrodes of the transistor 28, the cathode electrode of the diode being connected to the base electrode of the transistor 28 and the anode electrode of the diode being connected to the emitter electrode of the transistor 28 as illustrated. In addition, an inductor 32 may be connected in parallel with the diode 30 between the base and emitter electrodes of the transistor 28.

The emitter electrode of the transistor 28 may be connected through a current limiting resistor 34 and a primary winding P of a transformer 36 to a source of negative voltage. The emitter electrode of the transistor 28 may also be connected through a resistor 50 to an output terminal 52 and through a diode 54 and a capacitor 56 to ground. The diode 54-capacitor 56 junction may be connected to the source of negative voltage.

A feedback path may be provided between the emitter electrode and the base electrode of the transistor 28 by connecting the emitter electrode in series through a secondary winding S of the transformer 36, a current limiting resistor 38, and a diode 40 to the base electrode as illustrated. The collector electrode of the transistor 28 may be connected directly to source of positive voltage and the emitter electrode of the transistor 28 may be connected through a diode 42 to the source of positive voltage.

With continued reference to FIG. 2, the OFF trigger signal from the terminal 18 of the timing circuit 10 may be applied to the primary winding of a second isolation transformer 22. This OFF trigger signal from the secondary winding of the transformer 22 may be applied directly to the base electrode of an NPN transistor 44. The emitter electrode of the transistor 44 may be connected to the negative source of voltage and the collector electrode thereof may be connected both through a resistor 46 to the source of positive voltage and through a diode 48 to the diode 24-resistor 26 junction.

In operation, the ON trigger signal is coupled to the base electrode of the transistor 28 to drive the transistor 28 into saturation. The emitter electrode of the transistor 28 is thus raised to the potential of the positive source developing a signal across the primary winding of the transformer 36. This positive going signal is coupled through the secondary winding S of the transformer 36 to the base electrode of the transistor 28. As is indicated in a conventional manner by the dots on the windings of the transformer 36, the polarity of the signal coupled back to the base electrode of the transistor 28 via the secondary winding is such that a positive feedback signal is applied to the base electrode and the transistor 28 is thus held in saturation.

With the transistor 28 saturated, there is a negligible voltage drop, e.g., on the order of 0.5 volts, across transistor 28 and the entire positive source to negative source voltage swing is applied from the emitter electrode of the transistor 28 to the output terminal 52. The amplitude of the output signal is thus independent of the amplitude on the ON trigger signal and dependent almost solely upon the values of the positive and negative voltage sources. If these source values are kept constant, and in particular if the value of the positive voltage source is kept constant, the output pulse applied to the transmitter 14 exhibits very little or no amplitude jitter. Moreover, the transistor 28 need not be selected for specific values of gain or other like characteristics since it is operated only in the saturation region. This permits replacement of the transistor with an unmatched component. The power consumed by the transistor 28 is also minimal in that the voltage drop thereacross is minimized when saturation current flow is established therethrough.

When the transistor 28 is operated in saturation, the charge stored between the base to emitter and base to collector junctions may prevent the transistor from turning off rapidly and consistently if the turn off is achieved merely by removing the trigger signal or by removing the feedback signal from the base electrode. To avoid this delay the transistor 44 is provided to rapidly drive the transistor 28 into cutoff at the desired time as determined by the occurance of the OFF trigger signal.

In this regard, the OFF trigger signal drives the transistor 44 into saturation effectively placing a negative bias on the diode 24-resistor 26 junction in the base electrode circuit of the transistor 28. This negative bias immediately discharges the charge of the interelectrode capacitance of the transistor 28 and also discharges any stored energy in the load through the bypass diode 30. The transistor 28 is thus rapidly and consistently returned to a nonconductive condition in response to the OFF trigger signal. This consistent timing accuracy minimizes trailing edge jitter of the output pulse provided at the output terminal 52.

Figure 3:
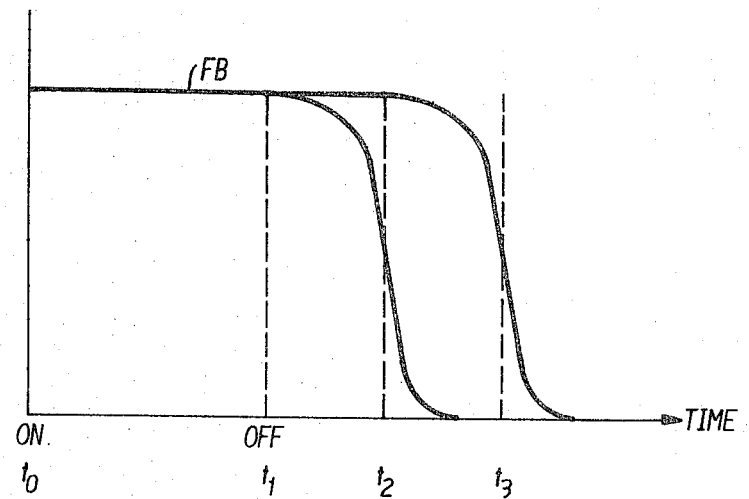
FIG. 3 is a graph illustrating the operation of the feedback network of the circuit of FIG. 2; and, FIG. 4 is a second embodiment of the circuit of the present invention utilized as the transmitter pulser in the system of FIG. 1.

With continued reference to FIG. 2 and with further reference to the graph of FIG. 3, the positive feedback signal FB assumes a high signal level maintaining the transistor 28 in saturation when the transistor 28 is driven into saturation by the ON trigger signal at time $t_0$. This feedback signal FB ordinarily remains at this high level until the transistor 44 is driven into saturation by the OFF trigger signal at time $t_1$.

However, each output pulse is developed across the primary winding of the transformer 36 and the impedance presented by the primary winding P of the transformer 36 becomes purely resistive at some time $t_3$ after the transistor 28 is driven into saturation. This transformer resistance is relatively low and considerable current is drawn through the transistor 28. The current drawn through the transistor 28 is particularly high in the event that the current limiting resistor 34 cannot be utilized to limit current through the winding P as in the embodiment hereinafter described in connection with FIG. 4.

The time interval $t_0$-$t_3$ is determined primarily by the voltage-turns (VT) product of the transformer 36. If the transistor 28 is operating in saturation when the impedance of the transformer primary P becomes purely resistive, it is likely that the transistor 28 will be ruined by the resultant high current flow.

To protect the transistor 28 from damage in this manner, the transistor 28 is rendered nonconductive prior to the time $t_3$. The RL time constant of the series-connected resistor 38-inductor 32 combination is selected such that the inductor 32 presents a purely resistive load to the feedback signal FB at a time $t_2$ prior to the time $t_3$ that the primary P of the transformer 36 becomes purely resistive.

In this manner, the feedback FB utilized to maintain the transistor 28 in saturation is effectively removed from the base electrode of the transistor 28 at the time $t_2$ thereby driving the transistor 28 into cut off at time $t_2$. This protects the transistor 28 from damage due to high currents resulting from the decrease in d.c. resistance of the primary winding P of the transformer 36 by effectively interrupting the current applied to the primary winding P. As is further illustrated in FIG. 3, the OFF trigger is timed such that ordinarily the transistor 28 is driven into cut off by the OFF trigger signal at time $t_1$ unless, for example, the OFF trigger is for some reason not generated. The circuit described is thus fail safe with respect to protecting the transistor 28 against damage as a result of the failure of the transistor 44 to conduct prior to time $t_3$ as would occur in the event of a lost OFF trigger pulse.

Referring again to FIG. 2, the diodes 42 and 54 and the capacitor 56 form a bipolar arc protection circuit. Arcing in the transmitter 14 may produce at the terminal 52 either positive or negative voltage transients which exceed the values of the source voltages. Positive going transient voltages above the value of the positive source forward bias the diode 42 into conduction and the positive transient voltages are then shunted through the diode 42 to the source where the transient voltage is shunted to ground through the filter capacitors in the power source as is indicated in phantom. In a like manner, negative transient voltages below the value of the negative source forward bias the diode 54 and these negative voltage transients are clamped to ground potential through the source filter capacitors and, if required, the capacitor 56.

Figure 4:
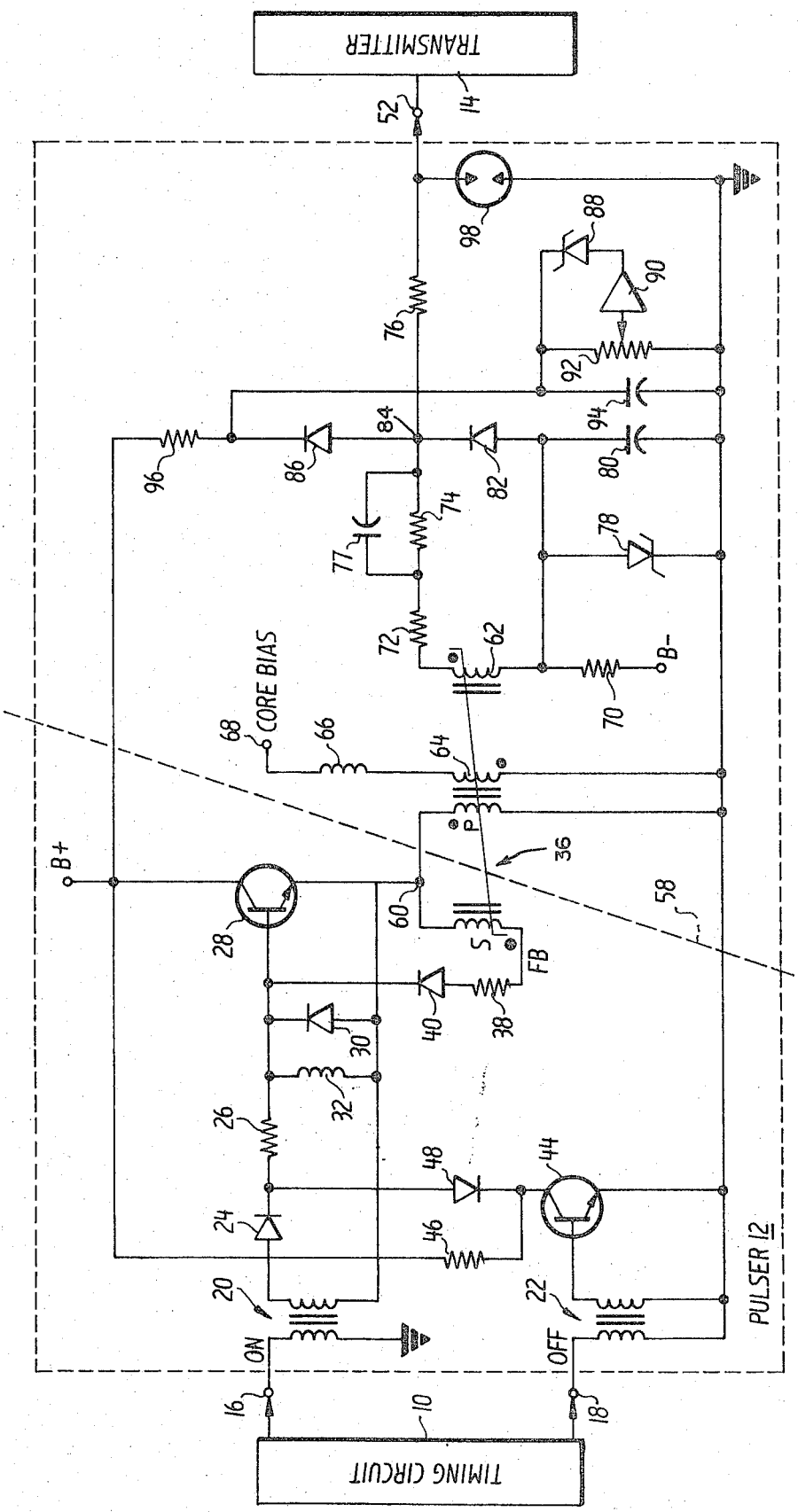

Referring to FIG. 4 where a second embodiment of the circuit is shown, the portion of the circuit to the left of the dashed line 58 is generally the same as the corresponding portion of the circuit of FIG. 2 with the exception that the emitter electrode of the transistor 44 is grounded rather than connected to the source of negative voltage. As a result, the base electrode of the transistor 28 is clamped to ground rather than to the negative voltage used in connection with the circuit FIG. 2 when transistor 44 is driven into saturation by the OFF trigger. Like reference numerals have thus been used to indicate elements previously discussed in connection with FIG. 2.

The circuit to the right of the dotted line 58 includes pulse voltage transformation means, and a bipolar clipping circuit for determining output pulse amplitude in both negative and positive directions. As will be described, the clipping circuit also functions as a bipolar solid state arc protector.

The voltage transformation means includes a step-up transformer including primary winding P and secondary winding 62 wound on a common core and may also include a core bias winding 64. The feedback winding S in the positive feedback circuit previously described in connection with FIG. 2 is also on the core with the winding P, 62 and 64. The relative polarities of the windings are indicated by the dots.

Windings P and S are connected in series with the interconnection point 60 connected to the emitter of the transistor 28. The free end of the winding S is connected to the resistor 38 to complete the aforementioned feedback circuit. Winding 64 is connected in series with a suitable choke coil 66 between system common and a terminal 68, at which terminal is applied a suitable core bias voltage. One end of the high voltage secondary winding 62 may be connected through a resistor 70 to a B-supply potential, and the other end of the winding 62 may be connected to the output terminal 52 through series connected resistors 72, 74 and 76. A capacitor 77 may be connected in parallel with resistor 74 to function, in combination with the resistor 74, as a rise time compensator for the pulses delivered by the high voltage secondary winding 62.

In operation, the pulser 12 of FIG. 4 may typically provide a pulse having an amplitude swing of 2,000 volts for application to the transmitter 14. As in the circuit of FIG. 2, pulse width limits are set by the characteristics of the transformer, as are the pulse rise and fall times. To accommodate the required pulse widths, a ribbon core biased by the application of a d.c. potential to the terminal 68 may be used to obtain maximum magnetic flux swing by permitting use of the entire hysteresis loop of the transformer. This permits the use of fewer transformer turns to obtain the required pulse width resulting in lower circuit losses. Depending on the voltage isolation requirements between the windings of the step-up transformer, the transistors 28 and 44 may utilize either ground or system common (as shown in FIG. 4) or may operate from a floating potential source.

Saturation of the transistor 28 by an ON trigger pulse applies a positive going voltage to the winding P of the step-up transformer. As in the circuit of FIG. 2, this positive going voltage is coupled to the transformer winding S and applied to the base of the transistor 28 to sustain the conduction thereof and thus the duration of the output pulse beyond that of the ON trigger pulse. The maximum period for which the pulse may be sustained is determined as was previously described by the transformer operating characteristics, and the inductor 32 is utilized to set the operational time constant within the limit of the transformer characteristics to prevent short circuiting of the transistor 28.

The signal developed across the primary winding P is also coupled to the secondary winding 62 and significantly increased in amplitude in accordance with the transformer primary winding P to secondary winding 62 turns ratio. The rise time of the signal coupled to the secondary winding 62 is compensated by combination of the resistor 74 and the capacitor 77 and this compensated signal is then clipped both positively and negatively.

Negative clipping is provided by a Zener diode 78 and a diode 82. The Zener diode 78 and an arc protection capacitor 80 are connected in parallel between the winding 62-resistor 70 junction and system common. The cathode electrode of the diode 82 is connected to the resistor 74-resistor 76 junctions indicated at 84 and the anode electrode of the diode 82 is connected to the winding 62-resistor 70 junction. When the diode 82 is back biased, negative voltage excursions at the junction 84 which exceed the reverse bias breakdown voltage of the Zener diode 78 are essentially shunted to system common. The reverse bias breakdown voltage of the diode 78 therefore sets the negative clipping level of the output pulse from the winding 62. High amplitude negative voltage spikes which might result from the occurrence of an arc are shunted to system common by the capacitor 80.

Positive clipping is provided by a diode 86, a Zener diode 88, and a conventional operational amplifier 90. The anode electrode of the diode 86 is connected to the junction 84 and the cathode electrode of the diode 86 is connected through a potentiometer 92 in parallel with an arc protection capacitor 94 to system common as well as to the cathode electrode of the Zener diode 88 and through a resistor 96 to the positive voltage source. The arm of the potentiometer 92 provides an input signal to the operational amplifier 90 and the output signal from the amplifier 90 is applied to the anode electrode of the Zener diode 88.

The amplifier 90 compensates for long term drift and provides a continuously variable pulse amplitude adjustment in accordance with the setting of the potentiometer 92. The output signal from the amplifier 90 is variable in accordance with the setting of the potentiometer 92 to vary the bias of the Zener diode 88, thus controlling the amplitude of the voltage required to effect reverse breakdown thereof. The diode 86 conducts when the signal at junction 84 is sufficiently positive to forward bias the diode. When the signal at the junction 84 is sufficiently positive with respect to the amplifier 90 output voltage that the Zener diode 92 breakdown voltage is exceeded, the signal at the junction 84 is clipped. Thus the amplifier 90 through the potentiometer 92 setting establishes the positive clipping level.

Assuming an infinite amplifier gain, the pulse amplitude regulation obtained by this amplitude clipping circuit becomes a function of the impedance ratio, between the dynamic impedance of the diode 86 and that of the resistors 72 and 74. A clipped and rise time compensated output pulse is thus formed in which amplitude and edge jitter is virtually eliminated.

Bipolar arc protection is provided by diodes 82 and 86 in conjunction with the capacitor 80 and 94, respectively. The charge developed on these capacitors is limited to that which accumulates before the firing of a spark gap device 98 which may be connected between terminal 52 and system common.

From the foregoing, it will be appreciated that an improved pulser has been described which generates jitter-free high-voltage pulses, which are independent of the amplitude of trigger pulses applied to the pulser. The pulser uses series conductor elements operated in their saturation and non-conduction modes, to minimize power ratings, eliminate replacement matching problems and sharpen output pulse waveforms. An improved transistor protection circuit is provided to prevent transistor destruction should an OFF trigger pulse be lost. Further, an improved clipping and arc protection circuit is provided for pulse height adjustment and protection against high voltage transients from the transmitter energized by the pulser.

The present invention may, of course, be embodied in other specific forms without departing from the spirit or essential characteristics thereof. The presently disclosed embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A circuit for intermittently energizing a wave energy transmitter comprising:

first and second semiconductor means each including first and second electrodes and a control electrode for controlling current flow between the first and second electrodes;

means including positive signal feedback means operatively connected to the control electrode of said first semiconductor means to drive said first semiconductor means into saturation in response to the application of a first trigger signal to the control electrode of said first semiconductor means and to hold said first semiconductor means in saturation;

circuit means including said second semiconductor means operatively connected to the control electrode of said first semiconductor means, said circuit means being operable to drive said first semiconductor means from saturation into a nonconductive condition in response to the application of a second trigger signal to the control electrode of said second semiconductor means;

means for driving said first semiconductor means from saturation into a nonconductive condition at a predetermined time, said predetermined time being subsequent to the expected time of arrival of said second trigger signal and prior to the time when current flow in said first semiconductor means exceeds the current capacity of said first semiconductor means; and, output circuit means operatively connected to said first semiconductor means for providing a transmitter energizing signal responsively to the saturation and nonconductive conditions of the said first semiconductor means, the amplitude of said energizing signal being independent of the amplitude of said trigger signals and the duration of said energizing signal being substantially equal to the spacing between corresponding portions of said first and second trigger signals.

2. The circuit of claim 1 wherein said output circuit means includes transformer means with a primary winding of said transformer means connected between one electrode of said first semiconductor means and a reference potential, the other electrode of said first semiconductor means being connected to a second reference potential; and, wherein said means for driving said first semiconductor means from saturation into a nonconductive condition includes means for rendering said first semiconductor means nonconductive at a time prior to the time when the impedance of the primary winding of said transformer means becomes purely resistive as a result of the saturation of said first semiconductor means.

3. The circuit of claim 2 wherein said driving means includes interconnected resistance and inductance means in series between the secondary winding of said transformer means and said one electrode of said first semiconductor means, the interconnection of the said resistance and inductance means being connected to the control electrode of said first semiconductor means for clamping the control electrode of said first semiconductor means to said one electrode thereof, prior to the time that the impedance of the primary winding of said transformer becomes purely resistive.

4. The circuit of claim 1 wherein said circuit means operable to drive said first semiconductor means from saturation into a nonconductive condition includes means including said second semiconductor means for clamping the control electrode of said first semiconductor means to a potential sufficient to rapidly dissipate the charge stored by the interelectrode capacitance thereof in addition to rendering said first semiconductor means nonconducting to thereby reduce trailing edge jitter.

5. The circuit of claim 4 wherein said circuit means operable to drive said first semiconductor means from saturation into a nonconductive condition includes means for driving said second semiconductor means into saturation in response to the application of said second trigger signal to the control electrode thereof.

6. A circuit for intermittently energizing a wave energy transmitter with an output of electrical energy having a predetermined amplitude and duration comprising:
a transistor connected between a first reference potential and a second reference potential, the difference in potential between the first and second reference potential being related to the desired amplitude of the output pulse;
timing means for providing first and second trigger pulses spaced in accordance with the desired duration of the output pulse;
means for driving said transistor into saturation and holding said transistor in saturation responsively to said first trigger pulse and means for driving said transistor into cutoff responsively to said second trigger pulse to form an output pulse at one electrode output of said transistor whereby the amplitude of said pulse is independent of trigger pulse amplitude and is limited in amplitude jitter to the jitter of the reference potentials; and,
means including said means for driving said transistor into cutoff, for discharging any load energy at said one electrode output of said transistor simultaneously with driving said transistor into cutoff.

7. The circuit of claim 6 wherein said means for driving said transistor into cutoff includes:
a second transistor connected between a control electrode of said first transistor and a third reference potential; and,
means responsive to said second trigger pulse for driving said second transistor into saturation thereby to apply the third reference potential to the control electrode to drive said first transistor rapidly into cutoff by discharging the interelectrode capacitance charge thereof and to thereby reduce the trailing edge jitter of the output pulse.

8. The circuit of claim 6 wherein said means for driving said transistor into saturation includes means for maintaining said transistor in saturation for a predetermined time after the application of said trigger pulse to the control electrode thereof thereby to sustain the conduction of said transistor in the absence of said second trigger pulse.

9. The circuit of claim 8 wherein said means for maintaining the conduction of said transistor includes transformer means having a primary winding connected between an output terminal of said transistor and said second reference potential, said transformer means having a secondary winding for applying a positive feedback signal to the control electrode of said transistor for said predetermined time interval said time interval being related to the VT characteristics of said transformer means.

10. The circuit of claim 9 and including means for removing said positive feedback signal prior to the time that the impedance of the primary winding of said transformer means becomes purely resistive thereby eliminating the inductance between the output terminal of said transistor and the second reference potential.

11. The circuit of claim 10 including resistive and inductive circuit means for shorting the control electrode of said transistor to said output terminal in a time interval less than the time interval between the application of said first trigger pulse to the control electrode of said transistor and the time that the impedance of the primary winding of said transformer means becomes purely resistive thereby to protect said transistor from damage due to failure to drive said first transistor into cutoff.

12. The circuit of claim 11 wherein the RL time constant of said resistive and inductive circuit means is longer than the expected duration of the output pulse whereby said transistor is protected against high currents without affecting output pulse waveform characteristics.

13. The circuit of claim 6 including means connected to said one electrode output for limiting the potential at said output above and below predetermined values, said limiting means including diodes connected respectively between the one electrode output and said first and second reference potentials, the forward biasing characteristics of said diodes relative to said first and second reference potentials being such that potentials at said one electrode output above and below the forward biasing characteristics of said diodes are dissipated respectively through the source for said first and second potentials, whereby said transistor is protected against arcing potentials generated by the wave energy transmitter to which said transistor is connected.

14. The circuit of claim 13 and further including Zener diode means connected between said diodes and said first and second reference potentials respectively for clipping voltage transients at said one electrode output above the forward biasing levels of said diodes and above the reverse biasing breakdown levels of said Zener diode means.

15. The circuit of claim 14 including amplifier means for varying the bias potential at the cathode electrodes of said Zener diode means to adjust the clipping levels thereof.

16. A method of generating a jitter free high energy pulse for energizing a wave energy transmitter comprising the steps of:
a. connecting first and second electrodes of a first transistor between first and second electrical potentials;
b. connecting a second transistor connected between a control electrode of said first transistor and a third electrical potential, said third electrical potential being below a cutoff potential of said first transistor;

c. providing a unidirectional current flow path between one of said first and second electrodes of said first transistor and said control electrode of said first transistor;

d. driving said first transistor into saturation in response to a first trigger signal to generate a rapid change from the first potential to the second potential said one of said first and second electrodes of said first transistor;

e. driving said second transistor into conduction in response to a second trigger signal subsequent to the first trigger signal to thereby apply said third electrical potential to said control electrode of said first transistor and generate a rapid change from the second electrical potential to the first electrical potential at said one of said first and second electrodes of said first transistor by discharging the interelectrode capacitance charge of the first transistor, said rapid change from said second potential to said first potential defining a trailing edge of an output pulse; and, f. clamping said one of said first and second electrodes of said first transistor to substantially the third electrical potential through said unidirectional current path and said second transistor in response to the second trigger signal to discharge any load energy at the second electrode of the first transistor thereby decreasing any tendency of the trailing edge of the output pulse to jitter.

17. A method of generating a jitter free high energy pulse for energizing a wave energy transmitter comprising the steps of:

a. connecting a first electrode of a transistor through a load transformer to a first electrical potential and a second electrode of the transistor to a second electrical potential;

b. driving the transistor into saturation in response to a first trigger signal to generate a rapid change from the first potential to the second potential at the first electrode of the transistor;

c. driving the transistor into cutoff in response to a second trigger signal subsequent to the first trigger signal to generate a rapid change from the second potential to the first potential at the first electrode of the transistor by discharging the interelectrode capacitance charge of the transistor, the charge from the second to the first potential defining a trailing edge of an output pulse;

d. clamping the output terminal of the transistor to substantially the second reference potential in response to the second trigger signal to discharge any load energy at the first electrode of the transistor thereby decreasing any tendency of the trailing edge of the output pulse to jitter; and, e. driving the transistor into cutoff at a predetermined time after driving the transistor into saturation upon failure of the second trigger signal to drive the transistor into cutoff, said predetermined time being subsequent to the expected time of arrival of said second trigger signal and prior to the time at which the load presented by the load transformer becomes purely resistive.

* * * * *